(12) United States Patent
Shimura et al.

(10) Patent No.: US 9,806,579 B2
(45) Date of Patent: Oct. 31, 2017

(54) MAGNET PLATE FOR LINEAR MOTOR FOR PREVENTING MISALIGNMENT OF MAGNETS

(71) Applicant: FANUC CORPORATION, Yamanashi (JP)

(72) Inventors: Yoshifumi Shimura, Yamanashi (JP); Yuusuke Kondou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 491 days.

(21) Appl. No.: 13/780,959

(22) Filed: Feb. 28, 2013

(65) Prior Publication Data

US 2013/0241319 A1    Sep. 19, 2013

(30) Foreign Application Priority Data

Mar. 19, 2012  (JP) .................. 2012-062663

(51) Int. Cl.
| | | |
|---|---|---|
| *H02K 5/00* | (2006.01) | |
| *H02K 41/03* | (2006.01) | |
| *H02K 1/28* | (2006.01) | |
| *H02K 1/27* | (2006.01) | |

(52) U.S. Cl.
CPC .................. *H02K 5/00* (2013.01); *H02K 1/27* (2013.01); *H02K 1/28* (2013.01); *H02K 41/031* (2013.01)

(58) Field of Classification Search
CPC .......... H02K 5/00; H02K 41/031; H02K 1/28; F16B 19/06; F16B 37/068
USPC ..... 310/12.24, 12.25, 12.27, 156.18, 156.19; 411/501, 180
See application file for complete search history.

(56) References Cited

U.S. PATENT DOCUMENTS

| | | | | |
|---|---|---|---|---|
| 3,571,903 | A | * | 3/1971 | Persson ................. B23P 19/062 29/432.1 |
| 3,783,313 | A | * | 1/1974 | Mathur .................. H02K 37/02 310/114 |
| 3,909,913 | A | * | 10/1975 | Tildesley ........................ 29/432 |
| 5,757,091 | A | * | 5/1998 | Sogabe et al. ............. 310/12.02 |
| 5,952,742 | A | * | 9/1999 | Stoiber et al. ............. 310/12.18 |

(Continued)

FOREIGN PATENT DOCUMENTS

| | | |
|---|---|---|
| JP | 01091652 A | 4/1989 |
| JP | 04042743 A | 2/1992 |

(Continued)

OTHER PUBLICATIONS

Kubo et al. (JP 2010120055 A) English Translation.*

(Continued)

*Primary Examiner* — Quyen Leung
*Assistant Examiner* — Robert E Mates
(74) *Attorney, Agent, or Firm* — Hauptman Ham, LLP (57) ABSTRACT

A magnet plate includes a regulating member which is adapted to be press-fitted to a blind hole of a base plate. The regulating member protrudes from the surface of the base plate at one end, and prevents a permanent magnet from moving in a transverse direction. The regulating member has a narrower portion having a width smaller than the blind hole. Upon press-fitting of the regulating member, the base plate undergoes plastic deformation and the deformed portion moves into a space between the narrower portion and the inner wall of the blind hole.

5 Claims, 10 Drawing Sheets (56) References Cited

U.S. PATENT DOCUMENTS

| | | | |
|---|---|---|---|
| 7,687,957 B2* | 3/2010 | Ochiai | H02K 1/278 310/156.08 |
| 7,781,932 B2* | 8/2010 | Jansen | 310/156.08 |
| 2003/0227221 A1* | 12/2003 | Yamamoto | H02K 29/03 310/12.26 |
| 2009/0152334 A1* | 6/2009 | Hovestadt et al. | 229/117.23 |
| 2011/0097172 A1* | 4/2011 | Maloney | 411/38 |

FOREIGN PATENT DOCUMENTS

| | | | |
|---|---|---|---|
| JP | 09019091 A | | 1/1997 |
| JP | 9511380 A | | 11/1997 |
| JP | 10-318229 A | | 12/1998 |
| JP | 10318229 A | * | 12/1998 |
| JP | 2004015873 A | * | 1/2004 |
| JP | 2006174583 A | | 6/2006 |
| JP | 2010120055 A | * | 6/2010 |

OTHER PUBLICATIONS

Arakawa (JP 10318229 A) English Translation.*
Kajiyama (JP 2004015873 A) English Translation.*
Office Action mailed Aug. 27, 2013 corresponds to Japanese patent application No. 2012-062663.
Corresponding Japanese Application No. 2012-062663 Office Action dated Jun. 4, 2013.
"Trend in Science and Technology, Machine Element Handbook," Japan Institute of Invention and Innovation, Sep. 25, 1980, pp. 24, 25, 34, 35, 686 and 687.

* cited by examiner

MAGNET PLATE FOR LINEAR MOTOR FOR PREVENTING MISALIGNMENT OF MAGNETS

RELATED APPLICATIONS

The present application is based on, and claims priority from, Japanese Application Number 2012-062663, filed Mar. 19, 2012, the disclosure of which is hereby incorporated by reference herein in its entirety.

BACKGROUND OF THE INVENTION

1. Field of the Invention

The present invention relates to a magnet plate for a linear motor for preventing misalignment of magnets.

2. Description of the Related Art

A magnet plate for a linear motor includes a metal plate and a plurality of permanent magnets arranged on the plate, and is used with an armature including windings. The permanent magnet provided on a surface of the magnet plate may be moved from a predetermined position upon large impact applied thereto. In order to prevent it, a linear motor including a magnet plate for positioning permanent magnets in position with the aid of an additional member protruding from the surface of the plate is known (see JP-B-2564851, JP-A-9-511380 and JP-A-2010-120055).

Figure 12:
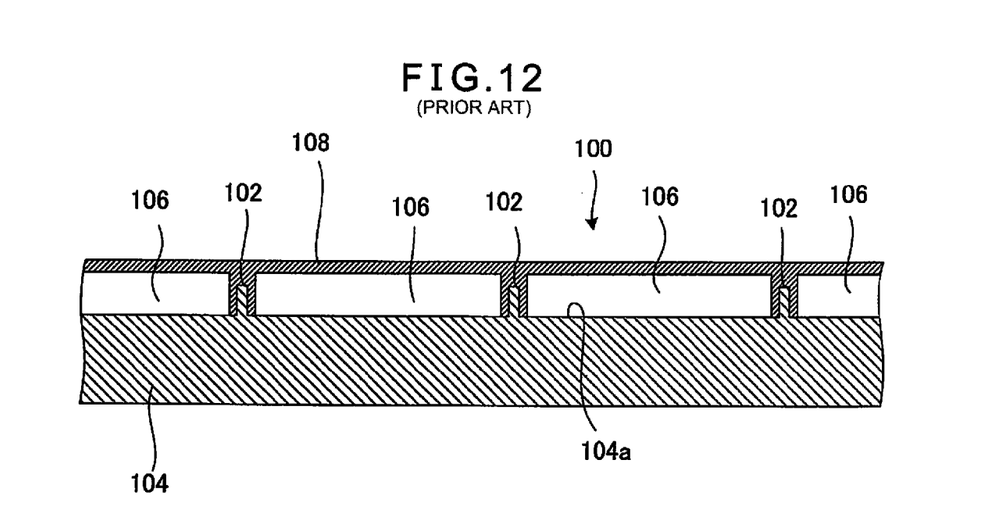
FIG. 12 is a sectional view illustrating an exemplary magnet plate according to a known art.
Figure 13:
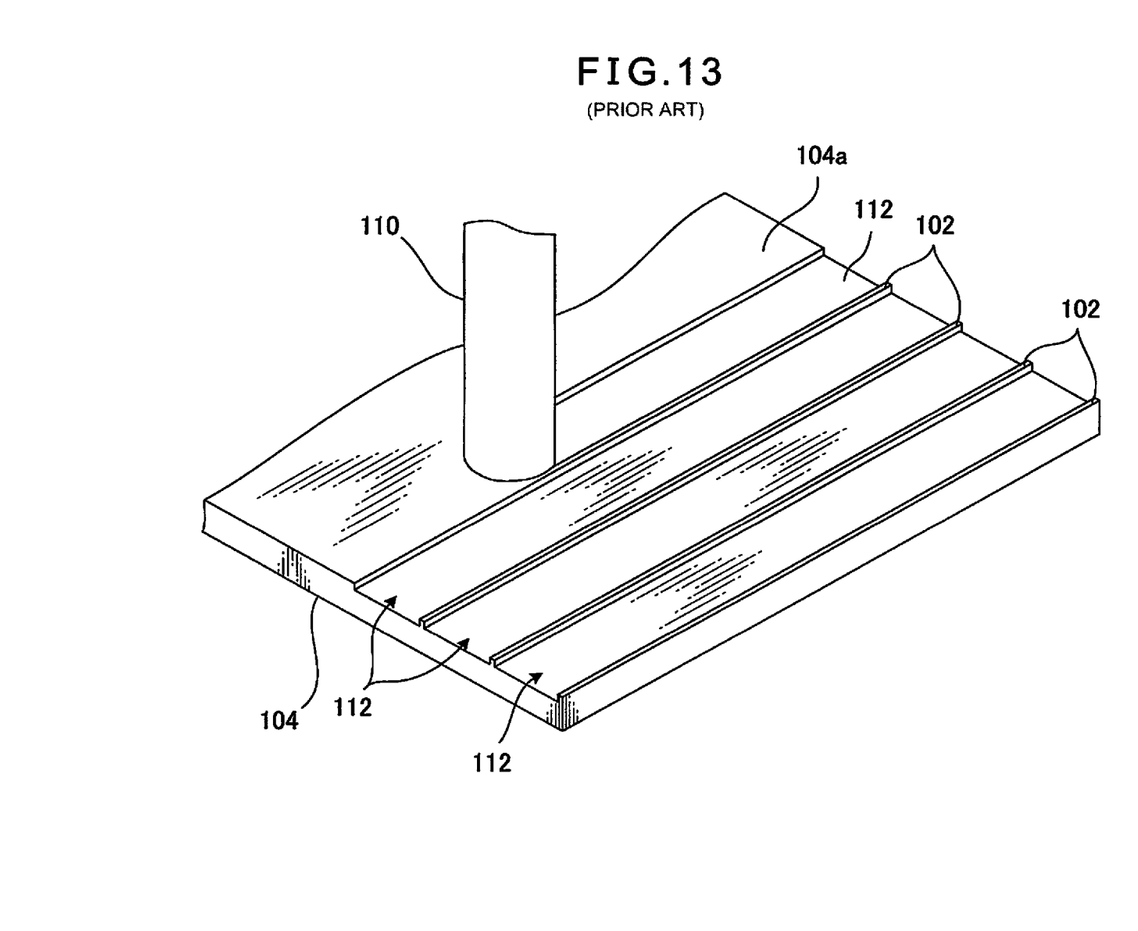
FIG. 13 is a perspective view illustrating a process for forming protrusions on the magnet plate shown in FIG. 12.

FIG. 12 is a sectional view illustrating an exemplary magnet plate 100 according to a known art. The magnet plate 100 includes a base plate 104, a plurality of permanent magnets 106, and a resin layer 108 formed on the base plate 104 and a surface of the permanent magnets 106. The base plate 104 has a plurality of protrusions 102 spaced apart from each other on a surface of the base plate 104. The permanent magnets 106 are situated between these protrusions 102. The protrusions 102 are intended to prevent the permanent magnets 106 from being misaligned in a transverse direction (a direction perpendicular to a longitudinal direction of the permanent magnet 106). FIG. 13 is a perspective view illustrating a process for forming the protrusions 102 on the magnet plate 100 shown in FIG. 12. In FIG. 13, only part of the base plate 104 and a cutting tool 110 are shown for simplicity. As illustrated, grooves 112 having a certain width are formed on the surface 104a of the base plate 104 by means of the cutting tool 110. Each of the protrusions 102 is formed between the adjacent grooves 112 to define side surfaces of the grooves 112.

Figure 14:
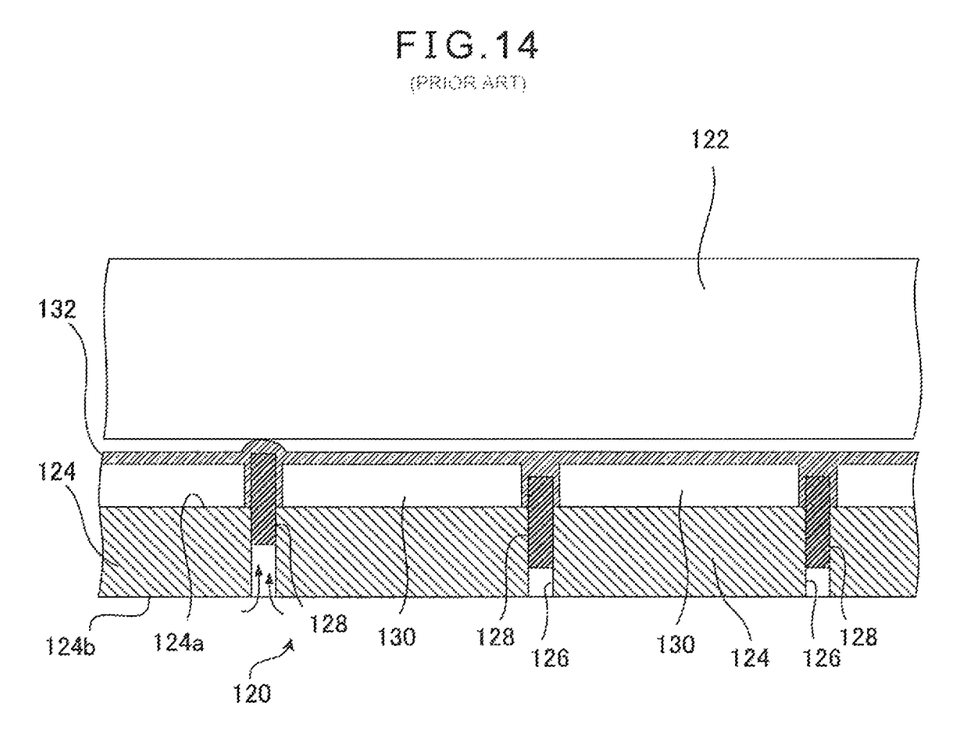
FIG. 14 is a section view illustrating an exemplary magnet plate according to another known art.

FIG. 14 is a sectional view illustrating an exemplary magnet plate 120 according to another known art. FIG. 14 shows an armature 122 provided opposite to the magnet plate 120. A plurality of through holes 126 are formed in a base plate 124 of the magnet plate 120. Pins 128 are press-fitted to the through holes 126 so that parts of the pins 128 protrude from a surface 124a of the base plate 124. The pins 128 of the magnet plate 120 prevent misalignment of permanent magnets 130, similarly to the protrusions 102 described above with reference to FIG. 12. However, when a linear motor is used as driving means for driving a machine tool, liquid such as cutting fluid may enter the through holes 126 from a back surface 124b of the base plate 124, as illustrated by arrows. As a result, the pin 128 moves toward the armature 122 from a predetermined position, and there may be a risk of bringing a resin layer 132 into contact with the armature 122.

In the known art described in relation to FIGS. 12 and 13, a cutting process for forming protrusions tends to increase production cost. In the known art described in relation to FIG. 14, structural strength of protruding members attached to the base plate is not necessarily reliable. Accordingly, there is a need for an inexpensive magnet plate for a linear motor for preventing misalignment of magnets.

SUMMARY OF THE INVENTION

According to a first invention, a magnet plate for a linear motor for producing driving force for linear movement in cooperation with an armature is provided. The magnet plate comprises a flat plate provided with a plurality of blind holes, a plurality of permanent magnets arranged on the flat plate, and a plurality of regulating members for regulating movement of the permanent magnets on the flat plate, the regulating members being press-fitted to the blind holes at one ends and protruding from the flat plate at the other ends, wherein the regulating members are made of a material harder than a material of the flat plate, the regulating members having, at one ends where the regulating members are press-fitted to the blind holes, a widened portion having a width larger than the blind holes in a direction perpendicular to a direction in which the regulating members are press-fitted to the blind hole, and a narrower portion having a width smaller than the blind holes in a direction perpendicular to a direction in which the regulating members are press-fitted to the blind hole.

According to a second invention, in the magnet plate for a linear motor according to the first invention, the blind holes have a circular cross-section and the regulating members have a cylindrical shape, the widened portion having an outer diameter larger than a diameter of the blind hole, the narrower portion having an outer diameter smaller than the diameter of the blind hole.

According to a third invention, in the magnet plate for a linear motor according to the first invention, the regulating members have an elongated shape extending along side edges of the permanent magnets, the widened portion and the narrower portion extending along longitudinal directions of the regulating members.

According to a fourth invention, in the magnet plate for a linear motor according to any one of the first to third inventions, the regulating members have, at the other ends where the regulating members protrude from the flat plate, an inclined surface serving as a guide for guiding the permanent magnets when the permanent magnets are arranged on the flat plate.

According to a fifth invention, in the magnet plate for a linear motor according to any one of the first to fourth inventions, the regulating members have, at the other ends where the regulating members protrude from the flat plate, a convex portion and a concave portion formed on side surfaces of the regulating members facing the permanent magnets adjacent thereto, the convex portion and the concave portion defining a gap therebetween, the magnet plate further comprising a resin layer covering a surface of the flat plate, the permanent magnets and the regulating members.

According to a sixth invention, in the magnet plate for a linear motor according to any one of the first to third inventions, the regulating members have, at the other ends where the regulating members protrude from the flat plate, a flange portion extending parallel to a surface of the flat plate and beyond side edges of the permanent magnets adjacent to the regulating members.

According to a seventh invention, in the magnet plate for a linear motor according to any one of the first to sixth inventions, the permanent magnets have a surface having a circular arc shape, a hyperbolic cosine shape or a stepped shape and projecting away from a surface of the flat plate.

These and other objects, features and advantages of the present invention will become more apparent in light of the detailed description of exemplary embodiments thereof as illustrated by the drawings.

DETAILED DESCRIPTION

Embodiments of the present invention will be described below with reference to the accompanying drawings. Constituent elements of the illustrated embodiments may be modified in size in relation to one another from the practical application for better understanding of the present invention.

Figure 1:
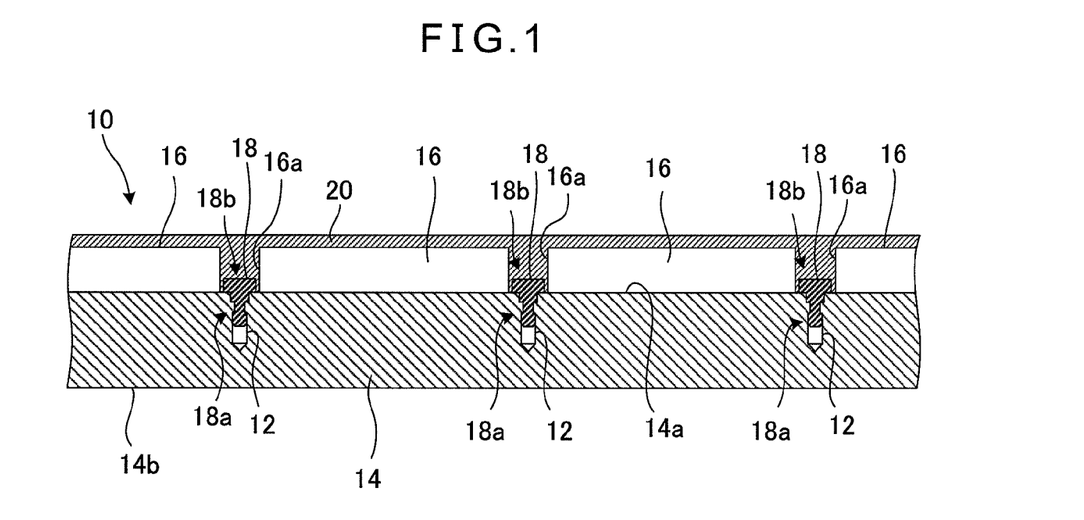
FIG. 1 is a sectional view illustrating a magnet plate according to one embodiment of the present invention.

First, a first embodiment of the present invention will be described, referring to FIG. 1. FIG. 1 is a sectional view illustrating a magnet plate 10 according to one embodiment of the present invention. The magnet plate 10 includes a base plate 14 which is a flat plate provided with a plurality of blind holes 12, and a plurality of permanent magnets 16 arranged on the base plate 14. Regulating member 18, which will be further described below, are press-fitted to the blind holes 12. Specifically, the regulating members 18 are press-fitted to the blind holes 12 at one ends, i.e., at lower portions 18a, while protruding from the base plate 14 at the other ends, i.e., at upper portions 18b. The permanent magnet 16 is a sintered magnet substantially having a rectangular parallelepiped shape, for example. The magnet plate 10 includes a resin layer 20 for covering surfaces of the permanent magnets 16 and the regulating members 18.

The magnet plate 10 is one of constituent elements of a linear motor, which is not shown, and used to produce driving force for linear movement in cooperation with an armature, which is not shown, either. The armature at least includes an iron core and windings, and the windings are provided opposite to the permanent magnets 16 of the magnet plate 10. Since a configuration of the armature and other constituent elements of the linear motor are well known in the art, detailed explanations thereon will be omitted. In the context of the present invention, either one of the armature and the magnet plate 10 may be capable of linear movement as a rotor, or both the armature and the magnet plate 10 may also be capable of linear movement in opposite directions.

The base plate 14 is formed from a relatively soft metal having low magnetic permeability material, such as S10C or SS400. Specifically, a material of the base plate 14 is selected in relation to a material of the regulating members 18. In addition, a material of the regulating member 18 is selected such that magnetic permeability of the base plate 14 is low enough to prevent magnetic flux leakage therethrough.

The blind holes 12 of the base plate 14 substantially have a circular cross-section and are open on a surface 14a of the base plate 14, while close on a bottom surface 14b. The blind holes 12 are formed, for example, by means of hole-drilling to a certain depth of the base plate 14 with a drilling machine. The blind holes 12 may be formed in an alternative way in which through holes penetrating the base plate 14 are formed, and then openings on the bottom surface 14b of the base plate 14 are closed by welding. The blind holes 12 may also be formed in a way in which through holes formed in the base plate 14 are sealed on the bottom surface 14b, as long as it is ensured that liquid such as cutting fluid is prevented from flowing into the blind holes 12 through the sealing.

The blind hole 12 of the base plate 14 is provided so as to be slightly distant from a position at which a side edge 16a of the permanent magnet 16 is situated. A plurality of the blind holes 12 are arranged along the side edges 16a of the permanent magnets 16. Corresponding to the positions and the number of blind holes 12, a plurality of the regulating members 18 are provided. Accordingly, a plurality of the regulating members are arranged along the side edges 16a of the permanent magnets 16 in accordance with the present embodiment. A protruding portion of the regulating member 18 protruding from the surface 14a of the base plate 14 functions to restrict the permanent magnets 16 from moving on the base plate 14. Specifically, the permanent magnets 16 are restricted from moving in a direction parallel to the surface 14a of the base plate 14.

The resin layer 20 is provided to protect the constituent elements such as the permanent magnets 16. The resin layer 20 is formed from a material having good chemical resistance to cutting fluid or grinding fluid, such as epoxy resin and phenol resin. The resin layer 20 is formed by injecting resin to a certain area on the surface of the magnet plate 10 with the aid of a jig, and then, by shaping the resin into a desirable shape as necessary by cutting.

Figure 2:
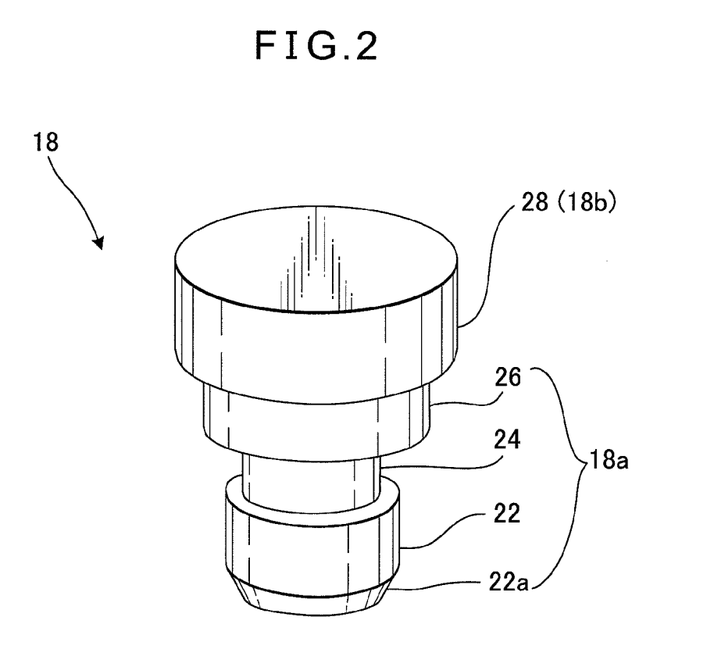
FIG. 2 is a perspective view illustrating a regulating member according to one embodiment of the present invention.
Figure 3A:
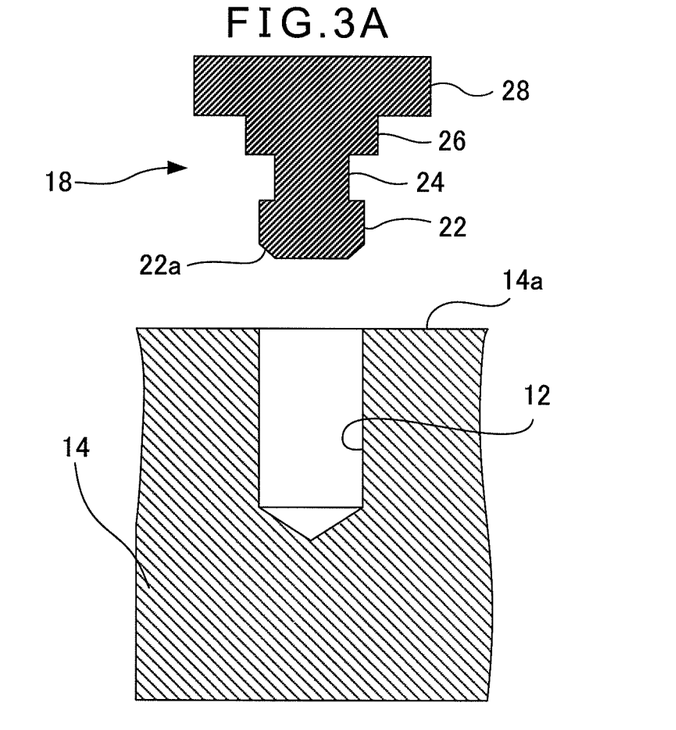
FIG. 3A is an enlarged sectional view to further explain a process for press-fitting the regulating member.
Figure 3B:
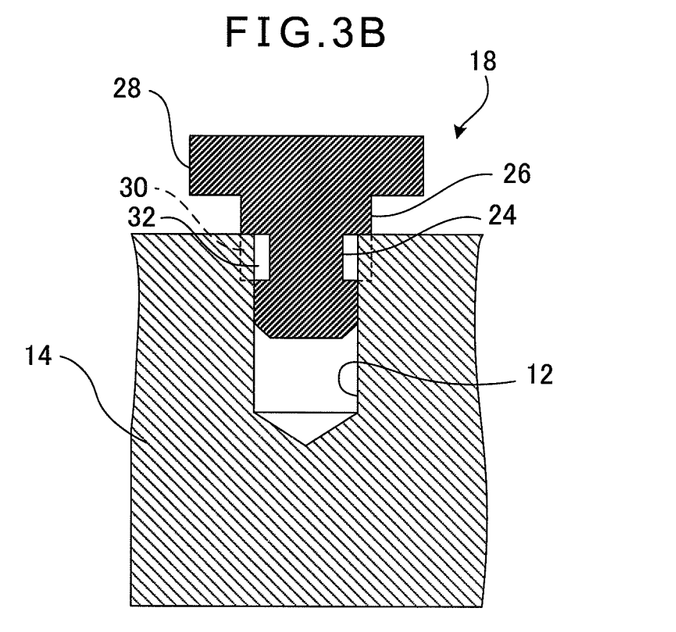
FIG. 3B is an enlarged sectional view to further explain a process for press-fitting the regulating member.
Figure 3C:
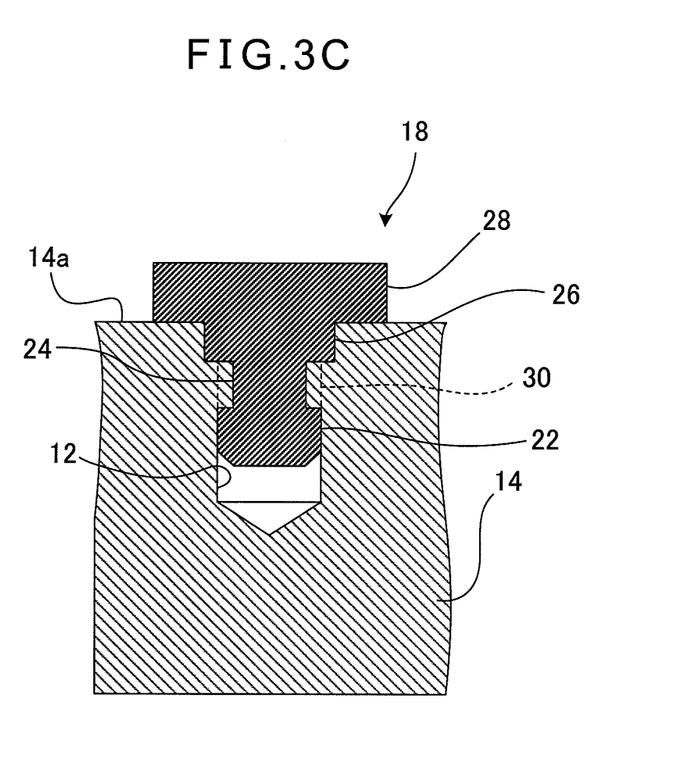
FIG. 3C is an enlarged sectional view to further explain a process for press-fitting the regulating member.

Next, the regulating members 18 will be described in more details, with reference to FIGS. 2 and 3A to 3C. FIG. 2 is a perspective view illustrating a regulating member 18 according to one embodiment of the present invention. FIGS. 3A to 3C are enlarged sectional views to further explain a process for press-fitting the regulating member 18.

The regulating member 18 is formed from a relatively hard material having low magnetic permeability, such as SUS304. A material of the regulating member 18 is harder than a material of the base plate 14 and has low magnetic permeability so that magnetic flux leakage through the regulating member 18 does not occur.

The regulating member 18 according to the present embodiment is in the form of a pin substantially having a cylindrical shape. The regulating member 18 is integrally formed and includes four cylindrical portions having different outer diameters from one another as shown in FIG. 2. As described above, the regulating member 18 has a lower portion 18a which is adapted to be press-fitted to the blind hole 12, and an upper portion 18b which is adapted to protrude out of the blind hole 12 and therefore from the surface 14a of the base plate 14. The lower portion 18a has a tip portion 22 having a cross-section which substantially matches the cross-section of the blind hole 12, a narrower portion 24 having an outer diameter smaller than the tip portion 22, and a widened portion 26 having an outer diameter larger than the tip portion 22 (see FIG. 3B). The tip portion 22 has at a tip end of the regulating member 18 a tapered portion 22a having an outer diameter which gradually decreases toward the tip end. The upper portion 18b defines a protruding portion 28 protruding from the surface 14a of the base plate 14 to regulate movement of the permanent magnets 16. The protruding portion 28 has an outer diameter larger than the widened portion 26 so that the regulating member 18 does not enter the blind hole 12 farther than necessary. It is inexpensive to produce such a member in the form of a pin, and is possible to press-fit it to the blind hole 12 efficiently. Further, it is advantageous that the protruding portion 28 has large cross-section area, which allows the regulating member 18 to be press-fitted to the blind hole 12 more efficiently by applying greater force thereto.

FIG. 3A is an exploded view prior to press-fitting of the regulating member 18 to the blind hole 12. The regulating member 18 is inserted to the blind hole 12 from the tip portion 22. Since the tip portion 22 substantially has the same cross-section as the blind hole 12 as described above, it is easy for the tip portion 22 to enter the blind hole 12 without great force applied thereto. In this process, the tapered portion 22a at the tip end of the regulating member 18 serves as a guide to facilitate insertion of the regulating member 18. The tip portion 22 has a relatively larger allowance as long as there is no difficulty in inserting the tip portion 22 to the blind hole 12. However, it is advantageous that the cross-section of the tip portion 22 matches that of the blind hole 12 as illustrated, which allows centering of the regulating member 18 within the blind hole 12 to be carried out at the same time.

FIG. 3B shows the regulating member 18 in a state where the tip portion 22 and the narrower portion 24 are inserted in the blind hole 12. It can be clearly seen that the outer diameter of the widened portion 26 is larger than the diameter of the blind hole 12. Since the narrower portion 24 is smaller than the diameter of the blind hole 12, there is a gap 32 between the narrower portion 24 and the peripheral wall of the blind hole 12. The regulating member 18 in this state is pressed farther into the blind hole 12 by means of a pressing machine, the base plate 14 then plastically deforms since the regulating member 18 is made of a material harder than that of the base plate 14. As a result, a deformed portion 30 (see FIG. 3B) of the base plate 14 which is pressed by the widened portion 26 upon the press-fitting process is shifted to the inner side of the base plate 14 (see FIG. 3C). FIG. 3C shows the regulating member 18 after the press-fitting process is completed. Referring to FIG. 3C, the deformed portion 30 bounded by broken lines in FIG. 3B is shifted to the gap 32 between the blind hole 12 and the narrower portion 24.

In the present embodiment, the regulating member 18 has the widened portion 26 having a width larger than the blind hole 12 and the narrower portion 24 having a width smaller than the blind hole 12. Due to the widened portion 26, a portion defining a side wall of the blind hole 12, i.e., the deformed portion 30 surrounded by the broken lines undergoes plastic deformation. In addition, the narrower portion 24 defines the gap 32 with the blind hole 12 (see FIG. 3B), which allows the deformed portion 30 undergoing plastic deformation to move thereto. As a result, the regulating member 18 and the base plate 14 are securely fastened to each other, as shown in FIG. 3C.

According to the present embodiment, the magnet plate 10 with the regulating member 18 for preventing misalignment of the permanent magnets 16 without involving a cutting process, which has been used in the known art. With the configuration in which the regulating members 18 are press-fitted to the blind holes 12, the regulating members 18 can be prevented from shifting from positions at which they are press-fitted due to entry of liquid such as cutting fluid. With the configuration in which portions of the base plate 14 subject to plastic deformation are accommodated to the gaps 32 between the regulating member 18 and the blind hole 12, the regulating members 18 are securely fixed to the base plate 14. Therefore, according to the present embodiment, an inexpensive magnet plate 10 which can prevent the permanent magnets 16 from being misaligned can be provided.

In the following, various embodiments of the present invention different from the above embodiment will be described. However, matters which have already been described above will be omitted to avoid redundancy. The same or corresponding constituent elements are designated with the same referential numerals.

Figure 4:
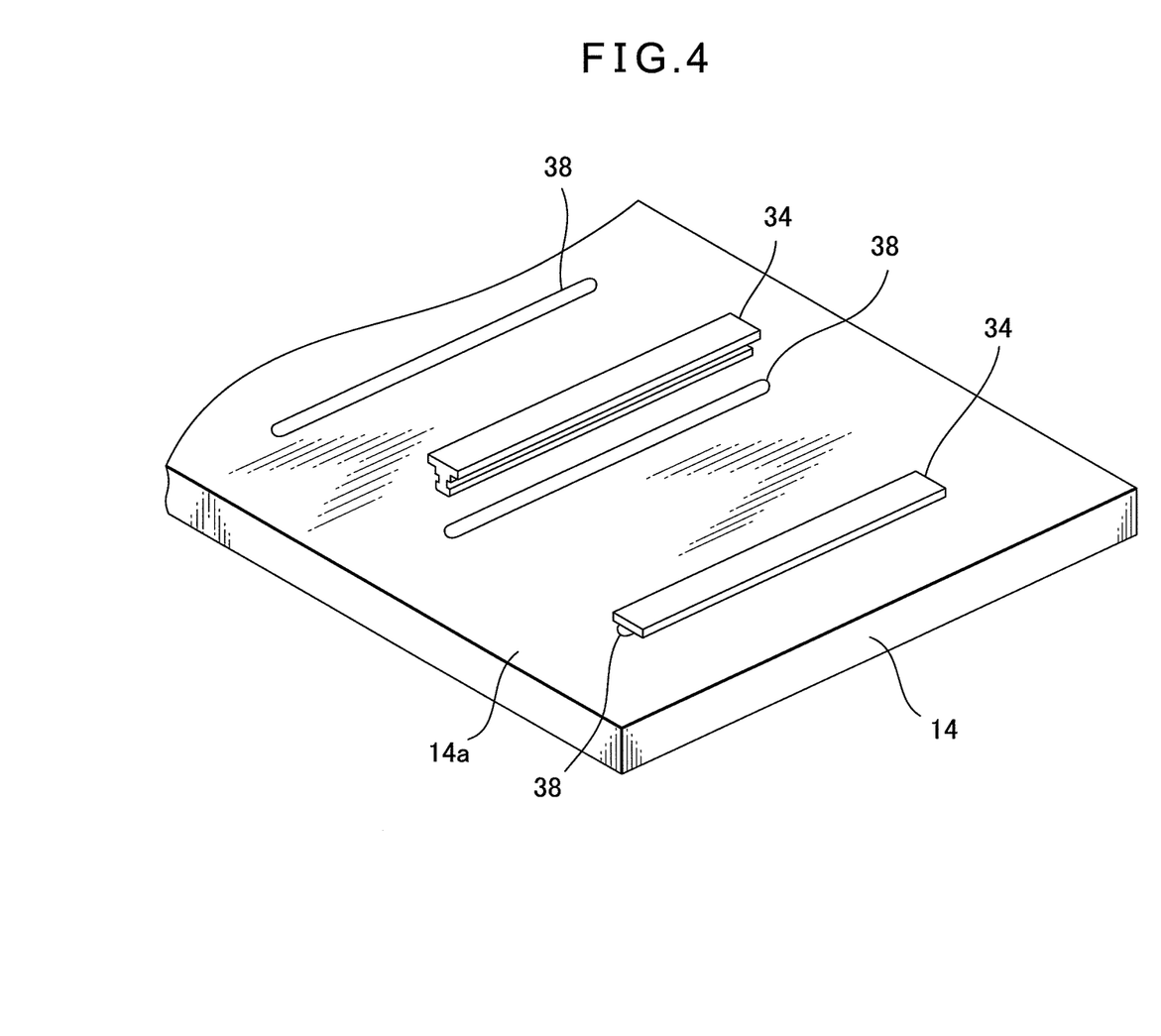
FIG. 4 is a perspective view to explain a regulating member according to a variant of the present invention.

FIG. 4 is a perspective view to explain a regulating member 34 according to a variant of the present invention. FIG. 4 shows a process for press-fitting the regulating members 34 to blind holes of the base plate 14. The base pate 14 is provided with a plurality of blind holes spaced apart from each other and the blind holes are in the form of grooves 38 extending longitudinally as illustrated. The grooves 38 extend substantially along positions where side edges of permanent magnets, which are not shown, are situated.

As illustrated, the regulating members 34 have an elongated shape of substantially the same entire length of the grooves 38. The regulating member 34 according to the variant has the same cross-section in a direction perpendicular to the longitudinal direction as that of the regulating member 18 described above and shown in, e.g., FIG. 3A. Thus, the regulating member 34 has the tip portion 22, the narrower portion 24, the widened portion 26 and the protruding portion 28, as shown in FIG. 3, for example. The tip portion 22, the narrower portion 24, the widened portion 26 and the protruding portion 28 have the uniform cross-sections along in a longitudinal direction of the regulating member 34, respectively. Therefore, this variant has the same advantageous effect as the above-described embodiment. In addition, the regulating members 34 according to the variant can prevent misalignment of the permanent magnets along lines, rather than a group of points in the above regulating member 18, which provides a broader effect and ensures that the misalignment of the permanent magnets can be prevented. Furthermore, fastening between the regulating member 34 and the base plate 14 is established more broadly along lines, and it is ensured that the regulating member 34 are securely fixed.

Figure 5:
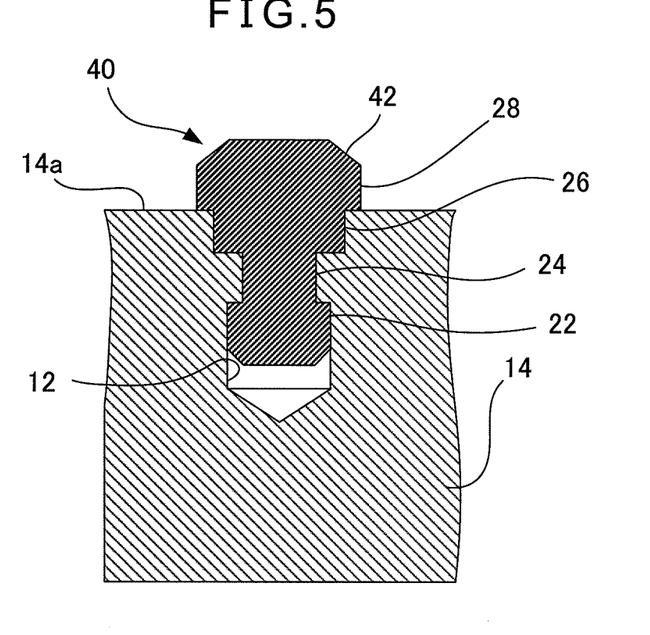
FIG. 5 is a sectional view to explain a regulating member according to another variant of the present invention.

FIG. 5 is a sectional view to explain a regulating member 40 according to another variant of the present invention. The regulating member 40 has a tip portion 22, a narrower portion 24, a widened portion 26 and a protruding portion 28. The configurations of the tip portion 22, the narrower portion 24 and the widened portion 26 are the same as those described in relation to the above embodiments. However, the protruding portion 28 in this variant has an inclined surface 42 so that the protruding portion 28 has an outer diameter which gradually decreases toward a tip end of the regulating member 40. The inclined surface 42 serves as a guide for guiding a permanent magnet which is put on the base plate 14 in a direction perpendicular to the surface 14$a$ of the base plate 14. Thus, a process for attaching the permanent magnets can be facilitated. Although the regulating member 40 according to the variant is only shown in cross-section, the regulating member 40 may have a cylindrical shape or also have an elongated shape as described above with reference to FIG. 4.

Figure 6:
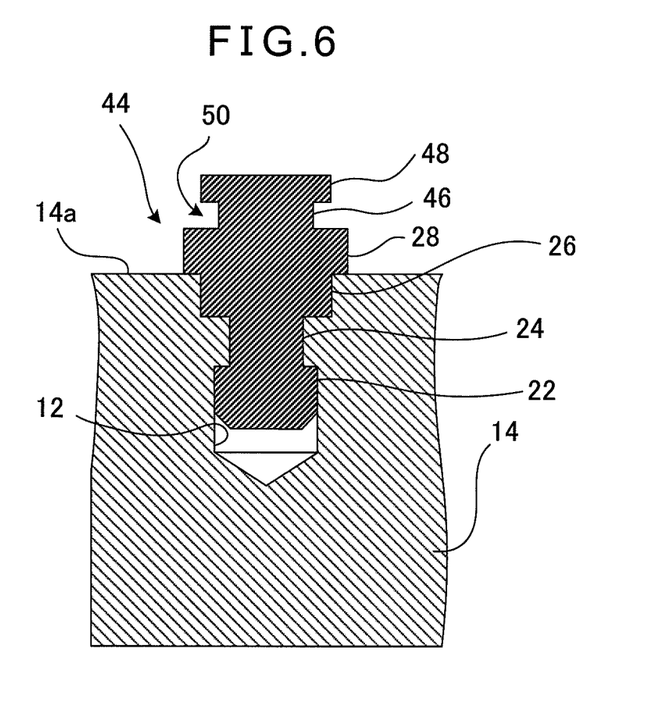
FIG. 6 is a sectional view to explain a regulating member according to yet another variant of the present invention.

FIG. 6 is a sectional view to explain a regulating member 44 according to yet another variant of the present invention. The regulating member 44 has a tip portion 22, a narrower portion 24, a widened portion 26 and a protruding portion 28, similarly to the above described embodiments. According to this variant, the protruding portion 28 protruding from the base plate 14 has a concave portion 46 and a convex portion 48 on side surfaces facing the adjacent permanent magnets (not shown). Specifically, the concave portion 46 is a portion having an outer diameter smaller than the protruding portion 28, and the convex portion 48 has an outer diameter at least larger than that of the concave portion 46. The concave portion 46 is situated between the convex portion 48 and the protruding portion 28. With this configuration, the concave portion 46 and the convex portion 48 define a gap 50 therebetween. Thus, when the resin layer (not shown) is formed to cover the base plate 14, the permanent magnets (not shown) and the regulating member 44, resin before hardened enters the gap 50 between the concave portion 46 and the convex portion 48. Accordingly, in the present variant, the surface area of the regulating member 44 in contact with the resin is increased, and therefore fitting force between the resin layer and the regulating members 44 is increased. As a result, the resin layer can be prevented from being removed from the regulating members 44. It is evident that the regulating member 44 is only illustrated by way of example, and therefore, the positions, areas and sizes of the convex and concave portions are not limited to the illustrated example. Although the regulating member 44 according to the variant is only shown in cross-section, the regulating member 44 may have a cylindrical shape or also have an elongated shape as described above with reference to FIG. 4.

Figure 7:
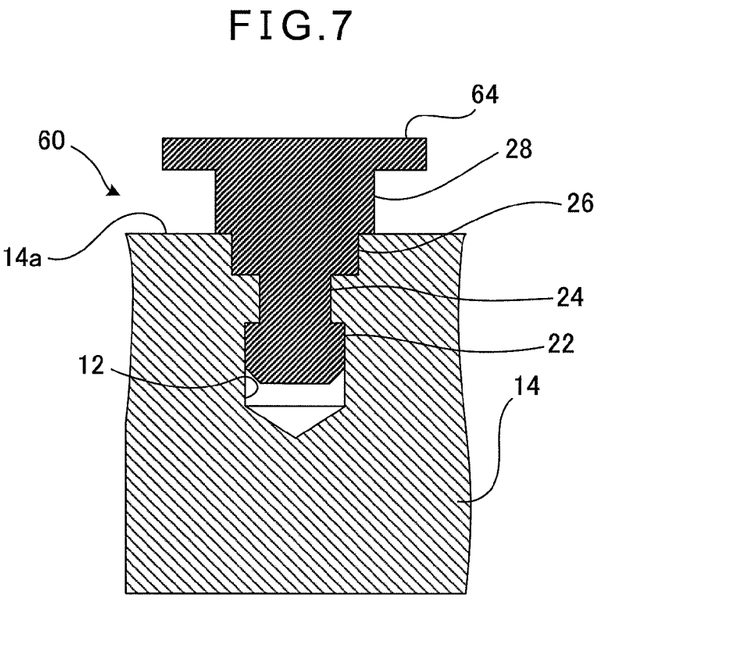
FIG. 7 is a sectional view to explain a regulating member according to yet another variant of the present invention.
Figure 8:
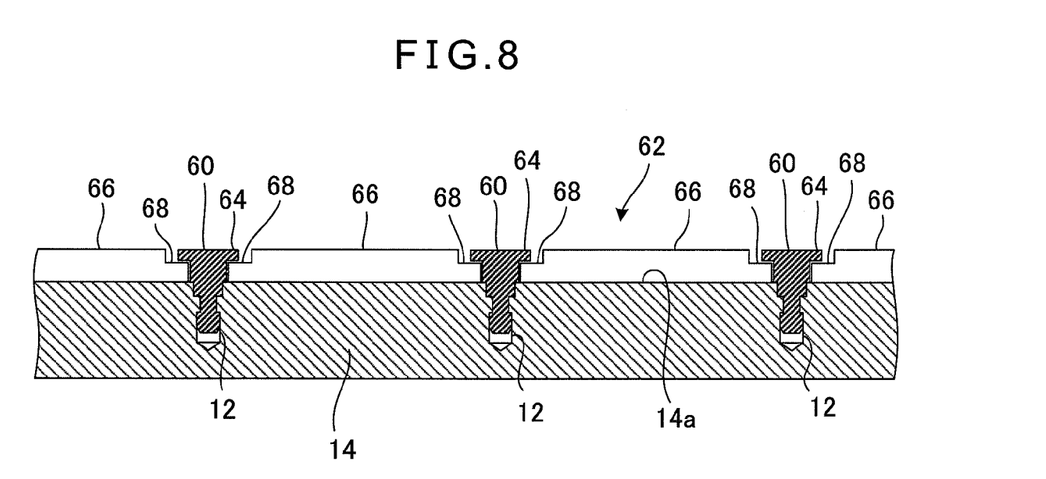
FIG. 8 is a sectional view illustrating a magnet plate including the regulating member shown in FIG. 7.

FIG. 7 is a sectional view to explain a regulating member 60 according to yet another variant of the present invention. FIG. 8 is a sectional view illustrating a magnet plate 62 including the regulating member 60 shown in FIG. 7. The regulating member 60 has a tip portion 22, a narrower portion 24, a widened portion 26 and a protruding portion 28, similarly to the above-described embodiment. The protruding portion 28 in this variant has at a base end of the regulating member 60 a flange portion 64 extending parallel to the surface 14$a$ of the base plate 14. The flange portion 64 is in the form of a circular plate or has an elongated shape, depending on the shape of the regulating member 60. As can be clearly seen in FIG. 8, the flange portion 64 extends beyond the side edges of the permanent magnets 66 adjacent to the regulating member 60. The permanent magnet 66 has a stepped shape including cut-away portions 68 on the side edges thereof.

Figure 9:
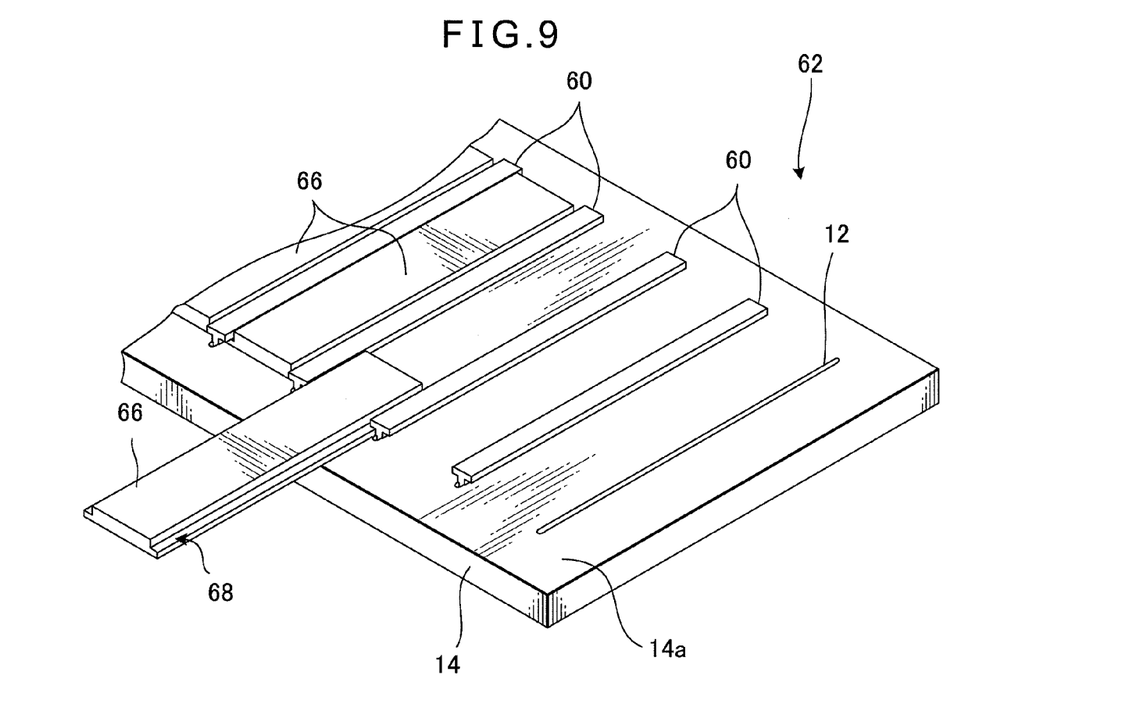
FIG. 9 is a perspective view illustrating a process for attaching permanent magnets to the magnet plate shown in FIG. 8.

FIG. 9 is a perspective view illustrating a process for attaching permanent magnets 66 to the magnet plate 62 shown in FIG. 8. As illustrated, the regulating members 60 are press-fitted to the blind holes 12 (or elongated grooves) of the base plate 14 before the attaching process. The permanent magnets 66 are inserted by sliding them into the space between the flange portions 64 of the regulating members 60 and the surface 14$a$ of the base plate 14 in longitudinal directions of the regulating members 60. The flange portions 64 serve as a guide for guiding the permanent magnets 66 when the permanent magnets 66 are inserted. In addition, the flange portions 64 prevent the permanent magnets 66 from moving in a direction perpendicular to the surface 14$a$ of the base plate 14. According to the present variant, not only can the permanent magnets 66 be prevented from moving in a transverse direction perpendicular to the longitudinal direction of the permanent magnets 66, but also in a vertical direction. Although the regulating members 60 having an elongated shape are illustrated by way of example according to the present variant, the regulating members 60 may also have a cylindrical shape as described with reference to FIG. 2. In this case, a plurality of the regulating members 60 are provided along positions where the side edges of the permanent magnets 66 are situated.

Figure 10:
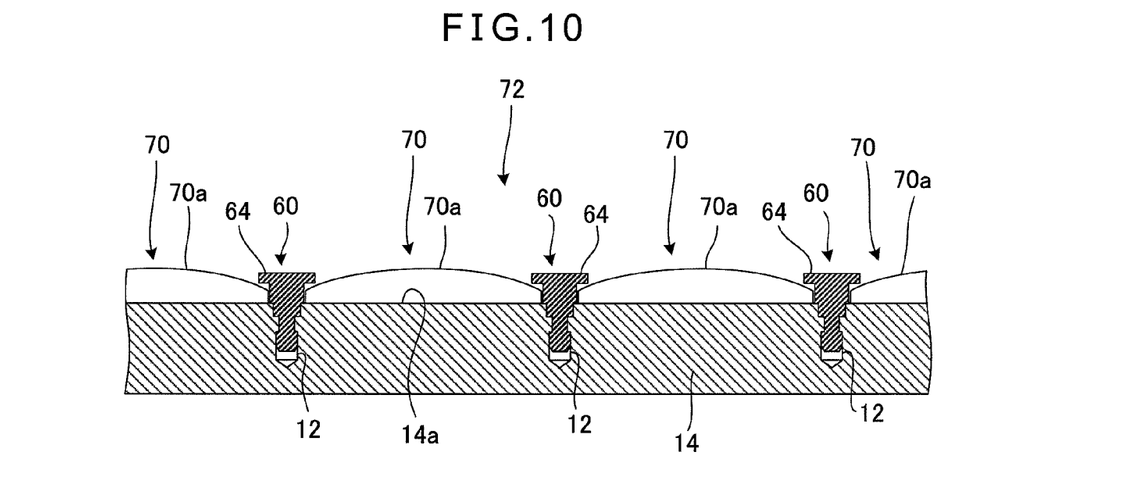
FIG. 10 is a sectional view illustrating a magnet plate according to another variant of the present invention.

FIG. 10 is a sectional view illustrating a magnet plate 72 according to another variant of the present invention. In the magnet plate 72, each permanent magnet 70 has a curved portion 70$a$ projecting away from the surface 14$a$ of the base plate 14. The curved portion 70$a$ is shaped so as to have a circular arc shape or a hyperbolic cosine shape. With the magnet plate 72 including the permanent magnets 70 having such a curved portion 70$a$, driving force generated by a linear motor can be controlled with high precision. Therefore, movement of a rotor of the linear motor can be precisely controlled.

Figure 11:
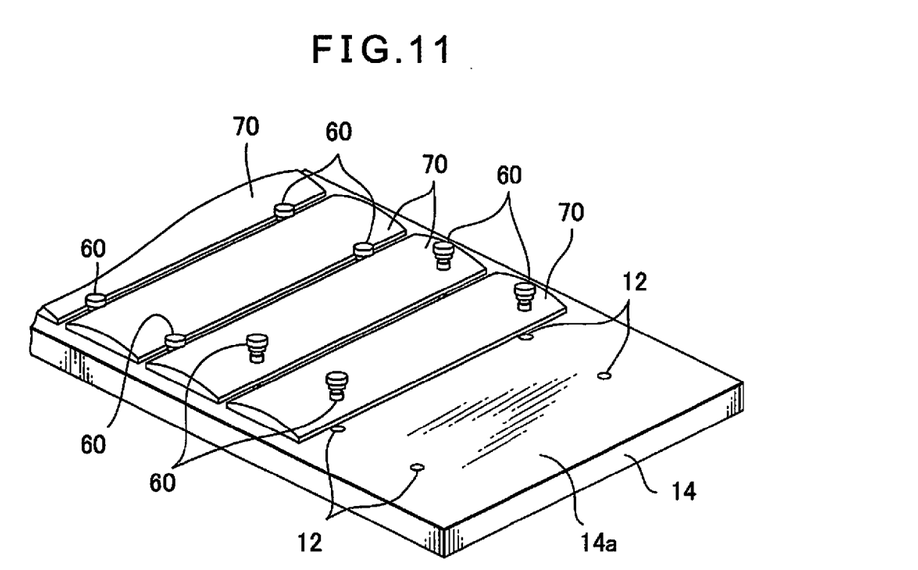
FIG. 11 is a perspective view illustrating a process for press-fitting the regulating members of the magnet plate shown in FIG. 10.

FIG. 11 is a perspective view illustrating a process for press-fitting the regulating member 60 of the magnet plate 72 shown in FIG. 10. In the present variant, the regulating members 60 are press-fitted to the blind holes 12 in a state where the permanent magnets 70 are arranged in position on the base plate 14. In this case, the permanent magnets 70 are sandwiched between the surface 14$a$ of the base plate 14 and the flange portions 64 of the regulating members 60. Therefore, not only can the permanent magnets 70 be prevented from moving in the transverse direction perpendicular to the longitudinal direction of the permanent magnets 70, but also in the vertical direction.

Although the concrete examples for implementing the present invention have been described, it is obvious to a person skilled in the art that the present invention can be implemented by any combination of embodiments and/or variants explicitly or implicitly disclosed herein.

Effect of the Invention

According to the first invention, misalignment of the permanent magnets on the plate can be prevented by the regulating members partially protruding from the plate. Since the regulating member is made of a material harder than a material of the plate, the plate undergoes plastic deformation by press-fitting the regulating member. In addition, with the narrower portion as well as the widened portion of the regulating member, a portion of the plate which undergoes plastic deformation moves to the space between the narrower portion of the regulating member and the blind hole. This allows the regulating member to be provided on the plate with sufficiently high structural strength without involving a cutting process, which tends to increase production cost. Furthermore, with the regulating member press-fitted to the blind hole, liquid such as cutting fluid can be prevented from entering the blind hole from the opposite side of the plate. A reliable magnet plate can thus be provided.

According to the second invention, the regulating member has a cylindrical shape, and therefore, a process for press-fitting the regulating member to the blind hole can be facilitated. In addition, the regulating member can be produced at low cost.

According to the third invention, the regulating member has an elongated shape extending along the longitudinal direction of the permanent magnet. This prevents the permanent magnet from being misaligned over the broader area along the longitudinal direction of the permanent magnet, and therefore the greater effect of preventing the misalignment can be provided. Further, fastening force between the regulating member and the blind hole can be provided over the broader area along the longitudinal direction of the permanent magnet, and therefore, unexpected movement of the regulating member can be prevented.

According to the fourth invention, the inclined surface of the regulating member serves as a guide for guiding the permanent magnet when the permanent magnet is provided in a direction perpendicular to the surface of the plate. Thus, the process of attaching the permanent magnet can be facilitated.

According to the fifth invention, with the convex portion and the concave portion formed on the protruding surface of the regulating member, resin is provided on the surface which is defined by the concave portion and the convex portion so that the surface area on which the resin and the regulating member are in contact with each other is increased. Therefore, the resin can be prevented from removing from the regulating member, and a reliable magnet plate can be provided.

According to the sixth invention, the regulating member has the flange portion extending beyond the side edges of the permanent magnet. The flange portion serves as a guide when the permanent magnet is attached in a direction parallel to the surface of the plate. The flange portion also prevents the permanent magnet from moving in a direction perpendicular to the surface of the plate. Therefore, misalignment of the permanent magnet can be prevented not only in a direction parallel to the surface of the plate, but also in a direction perpendicular thereto.

According to the seventh invention, with the permanent magnet having a shape projecting away from the surface of the plate, driving force generated by interaction between the armature and the magnet plate can be controlled with high precision. Accordingly, movement of a motor of an electric motor can be controlled with high precision.

Although the invention has been shown and described with exemplary embodiments thereof, it should be understood by those skilled in the art that the foregoing and various other changes, omissions and additions may be made therein and thereto without departing from the spirit and scope of the invention.

What is claimed is:

1. A magnet plate for a linear motor for producing driving force for linear movement in cooperation with an armature, the magnet plate comprising:
    a flat plate provided with a plurality of blind holes;
    a plurality of permanent magnets arranged on the flat plate;
    a plurality of regulating members for regulating movement of the permanent magnets on the flat plate, each of the regulating members having, in a height direction of the regulating member,
        a first end being press-fitted into a corresponding blind hole among the blind holes, and
        a second end protruding from the flat plate; and
    a resin layer covering a surface of the flat plate, the permanent magnets and the regulating members,
    wherein
    the regulating members are made of a material harder than a material of the flat plate,
    each of the regulating members has, at the first end where the regulating member is press-fitted into the corresponding blind hole,
        a widened portion having a width larger than the blind hole in a width direction perpendicular to the height direction in which the regulating member is press-fitted into the blind hole, and
        a narrower portion below the widened portion and having a width smaller than the blind hole in the width direction,
    each of the regulating members has, at the second end where the regulating member protrudes from the flat plate,
        a protruding portion above and continuous to the widened portion, the protruding portion having, in the width direction, a width larger than the widened portion,
        a convex portion above the protruding portion, and
        a concave portion between the convex portion and the protruding portion, wherein
        the protruding portion, the concave portion and the convex portion are formed on side surfaces of the regulating member facing the permanent magnets adjacent thereto, and
        the concave portion has, in the width direction, a width smaller than the protruding portion and the convex portion, and defines a gap between the protruding portion and the convex portion, and
    each of the regulating members has an elongated shape along a length direction of the regulating member, the length direction is perpendicular to the height direction and the width direction, the widened portion and the narrower portion extend along the length direction of the regulating member, and a length of the regulating member in the length direction is greater than a height of the regulating member in the height direction.

2. The magnet plate according to claim 1, wherein the elongated shapes of the regulating members extend along side edges of the permanent magnets.

3. The magnet plate according to claim 1, wherein each of the permanent magnets has a surface having a circular arc shape, a hyperbolic cosine shape or a stepped shape and projecting away from the surface of the flat plate.

4. The magnet plate according to claim 1, wherein a portion of the resin layer is in the gap.

5. The magnet plate according to claim 1, wherein each of the permanent magnets has a surface having a circular arc shape or a hyperbolic cosine shape.

* * * * *